T. K. NELSON.
MOTOR STAND.
APPLICATION FILED MAR. 27, 1917.
1,291,087.
Patented Jan. 14, 1919.
2 SHEETS—SHEET 1.
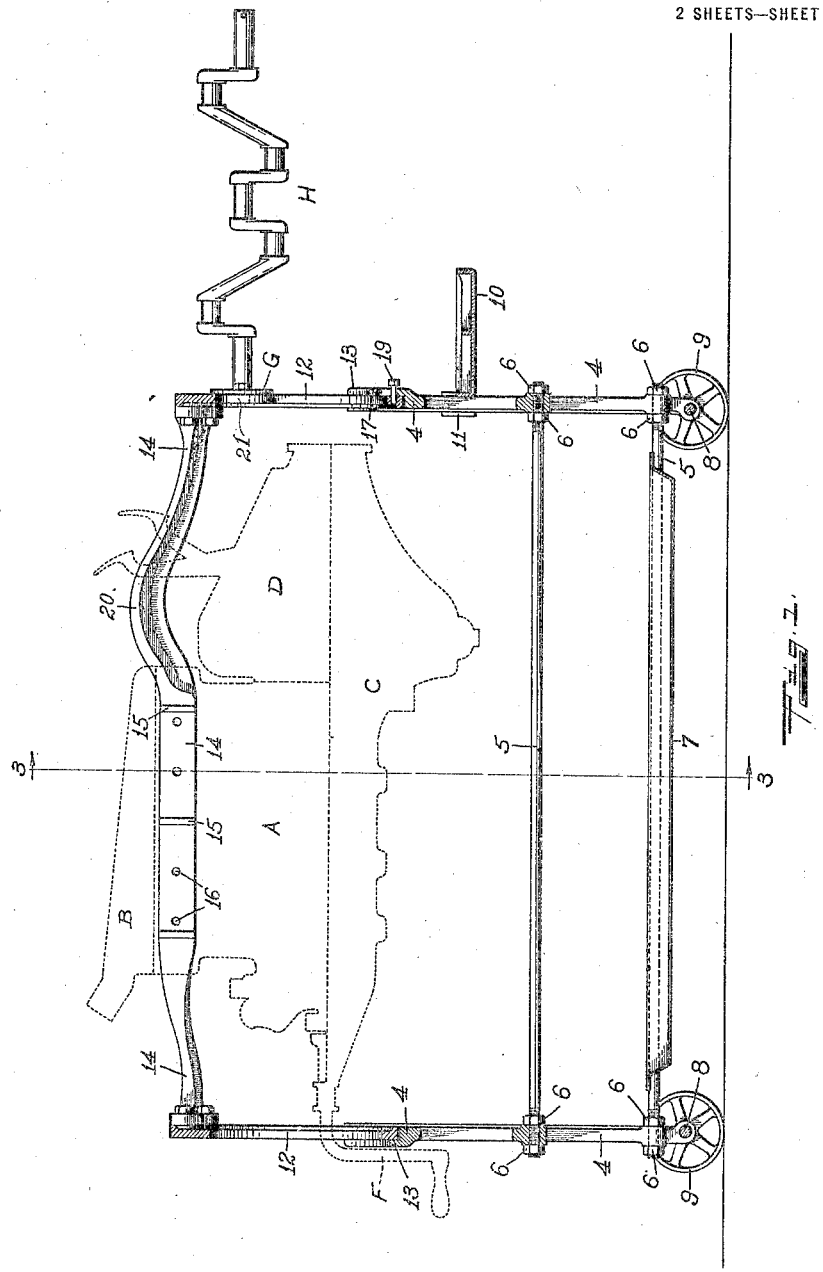
Thomas K. Nelson, Inventor.
Witness:
All Jamieson.
By David O. Barnell,
Attorney.

T. K. NELSON.
MOTOR STAND.
APPLICATION FILED MAR. 27, 1917.
1,291,087.
Patented Jan. 14, 1919.
2 SHEETS—SHEET 2.
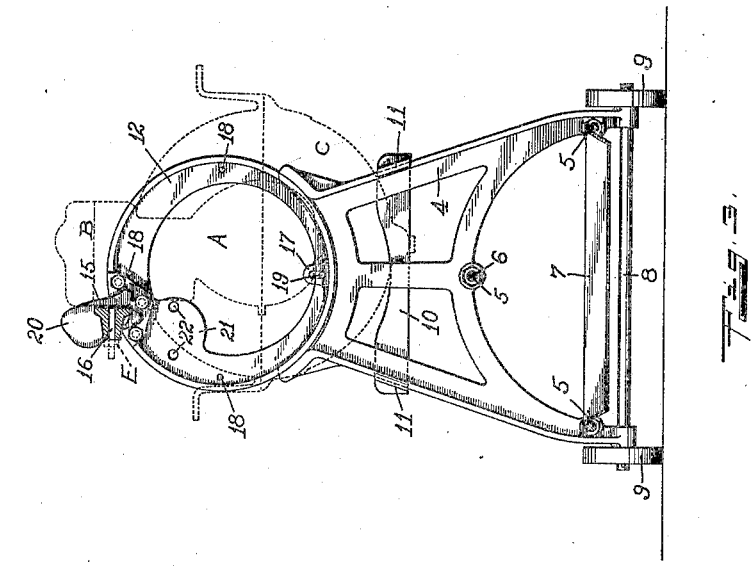
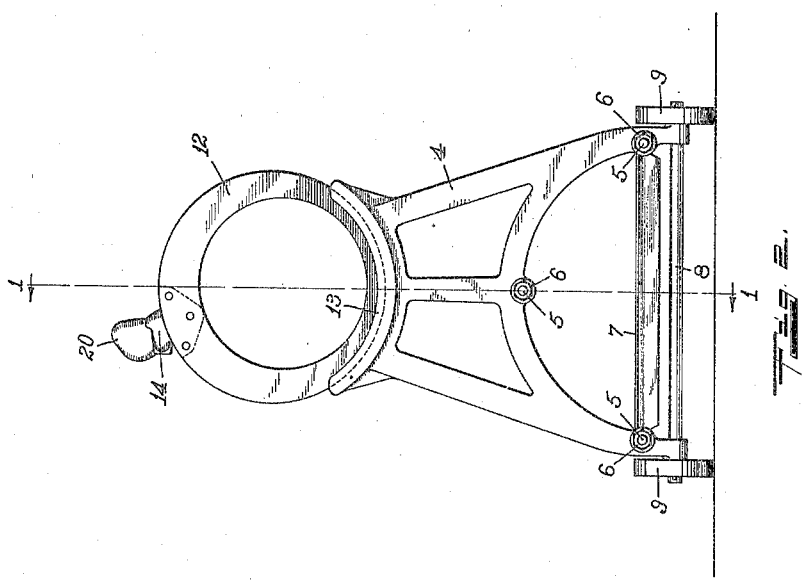
Thomas K. Nelson, Inventor.
Witness:
Alb. Jamieson.
By David O. Barnell
Attorney.

UNITED STATES PATENT OFFICE.

THOMAS K. NELSON, OF HARLAN, IOWA.

MOTOR-STAND.

1,291,087. Specification of Letters Patent. Patented Jan. 14, 1919.

Application filed March 27, 1917. Serial No. 157,648.

*To all whom it may concern:*

Be it known that I, THOMAS K. NELSON, a citizen of the United States, and a resident of Harlan, in the county of Shelby and State of Iowa, have invented certain new and useful Improvements in Motor-Stands, of which the following is a specification.

My invention relates to devices for supporting the engines of motor-vehicles in variable positions while repairing or adjusting the same, and it is the object thereof to provide a simple, inexpensive and efficient device for this purpose, in which the supporting parts will not interfere with complete disassembling and reassembling of the engine while the main body thereof remains upon the support. A further object of my invention is to provide a motor stand or support with which the motor or engine may be rotated about a longitudinal axis passing substantially through the center of gravity thereof, so that the same will remain in any position to which it may be rotated without being positively held or locked in said position, and so that a minimum alteration of the center of gravity will result from the removal of parts from the main body of the engine. A further object of my invention is to provide a motor stand in which the crankshaft of the engine mounted thereon is accessible for turning the same to run the engine or test the bearings thereof while the engine is supported upon the stand. A further object of my invention is to provide on the motor-stand a convenient means for supporting the engine crank-shaft separately, to facilitate the fitting of connecting-rod bearings thereon.

In the accompanying drawings Figure 1 is a longitudinal vertical section of a mechanism embodying my invention, the section being on the plane of the line 1—1 of Fig. 2, Fig. 2 is an end elevation of the same, and Fig. 3 is a vertical transverse section on the plane of the line 3—3 of Fig. 1.

In the illustrated embodiment of my invention there is a frame having vertical end-pieces 4 of which the lower portions are fixedly connected to each other by a plurality of rods 5, the ends of the rods being threaded, passed through openings in the end-pieces 4, and provided with nuts 6 which are screwed against the inner and outer sides of the end-pieces, as shown. Two of the rods 5 are arranged at the same level and support the longitudinal flanged edges of a drip-pan 7, the same resting removably upon said rods. Small shafts 8 pass transversely through the foot-portions of the end-pieces, and upon the ends of said shafts are revolubly mounted wheels 9 on which the frame is supported so as to be readily movable from place to place upon a floor. A compartmented tray 10 is provided, for holding tools and small parts such as bolts and nuts, as the same are removed from the motor on which work is being done. At one side of said tray the same has integral hooked lugs 11 adapted to pass over and engage detachably the diverging edges of the end-pieces 4, so that the tray will be supported thereby in horizontal position. The tray may be detached from, or placed on either end of the frame, as may be most convenient for the workman using the same.

At the upper end of each of the end-pieces the same has a concave arcuate seat for receiving the peripheral portion of a large ring or annular plate 12, and at the outer side of the concave seat there is an upwardly projecting flange 13 for preventing axial displacement of the rings from the seats. The two end-rings or annular plates 12 are connected with each other by means of a longitudinally extending bar 14, of which the ends are securely bolted to the rings at one side thereof so as to hold them parallel and in axially alined and spaced relation to each other.

The specific form of the motor-stand herein shown is especially adapted for use with engines of the design used in the well-known "Ford" motor-vehicles, said engines having at one side near the upper end of the main cylinder-body a machined plane-surfaced face against which the exhaust and intake manifold-pipes are secured by means of stud-bolts screwed into the cylinder-body. An intermediate portion of the support-bar 14 has plane-surfaced portions 15 adapted to fit against said face of the main engine-body, the bar having openings 16 therein suitably located and spaced to receive the same stud-bolts employed for fastening the manifold-pipes to the body. In Fig. 1 there is shown in dotted outline the main body A, the cylinder-heads B, the crank-case C and the transmission-cover D of an engine of the class mentioned.

For mounting the engine upon the motor-stand, it is merely necessary to remove the manifold-pipes from the main body A, then pass the manifold-securing stud-bolts through the openings 16 of the support-bar 14, and place suitable nuts E on the ends of the stud-bolts at the outer side of the bar, as indicated by dotted lines in Fig. 3. When securing together the support-bar 14 and the engine-body, said bar, together with the end-rings 12, may be lifted from the support-frame and secured to the engine while the latter rests upon the frame or chassis of the vehicle. After securing the support-bar to the engine-body, the same may be lifted by any suitable means and conveyed to the support-stand, or may be merely hoisted to a suitable elevation and the support-stand placed thereunder to receive the same when lowered. The end-rings 12 are so proportioned and arranged with respect to the support-bar 14 that the axis of said rings will pass approximately through the center of gravity of the entire assembly, including the engine, the bar 14 and the end-rings themselves. In consequence of this arrangement, when the rings rest in the arcuate seats therefor in the end-pieces of the support-frame, the engine may be turned about the axis of the rings to any desired position, and will remain erect, inverted, or at any intermediate position, whichever may be most convenient for working thereon. As the engine is disassembled and various parts thereof removed, the center of gravity of the remaining portions will be changed somewhat, but will not ordinarily be so altered as to make the torsional moment great enough to overcome the friction between the end-rings and the seats therefor on the support-frame, and to thus cause the same to assume a position other than that in which it may be intentionally placed. To provide, however, for any rotative tendency due to displacement of the center of gravity from the axis of the end-rings, or to maintain the engine in upright position while running the same, one of the flanges 13 has a slotted lug 17 extended upwardly therefrom, and the adjacent end-ring 12 has several holes 18 therein, so that a pin 19 may be passed through said lug and any of said holes to secure the rotary frame and support-frame in fixed relation.

To enable removal of the transmission-cover D, the support-bar 14 has an upwardly-bowed portion 20 adjacent to the rear of the engine-body, said portion 20 permitting the cover D to be raised sufficiently to detach it, without interference with the support-bar. It will be apparent that the crank-case C, cylinder-heads B, and all minor parts of the engine may be removed from the main body A while the latter remains upon the rotatable support. It should be noted also that the parts are so proportioned that the axis of the crank-shaft passes through the large axial openings of the end-rings, the radius of said openings being greater than the radial distance between the crank-shaft axis and a longitudinal axis passing through the center of gravity of the engine. Thus the starting-crank F may be used for rotating the crank-shaft, or any desired connection may be made at the other end to the transmission-shaft, without dismounting the engine from the stand.

For convenience in fitting connecting-rod bearings to the wrist-pins of the crank-shaft, it is desirable to provide a special supporting means for said shaft when the same is removed from the engine. For this purpose, one of the end-rings 12 is provided with an inwardly extending lug 21, having therein holes 22 spaced to correspond with the holes in the end-flange G of the crank-shaft H, said holes in the end-flange being those used for bolting the fly-wheel thereto. After disconnecting the fly-wheel from the shaft, and removing the latter from the engine, the end-flange G is bolted to the lug 21, and the shaft is thereby supported so as to extend out horizontally as shown in Fig. 1. By thus supporting the crank-shaft the same is readily accessible for fitting each of the connecting-rods to the crank or wrist-pin with which it is connected when in use, and one workman may be fitting the connecting-rods while another is working upon the engine itself.

Now, having described my invention, what I claim and desire to secure by Letters Patent is:

1. In a device of the class described, a support-stand having longitudinally spaced and alined arcuate seats, end-rings resting revolubly in said arcuate seats, and a single longitudinal member fixedly connected with said end-rings at points removed from the axis thereof, said member having intermediate portions adapted for connection with an engine-body to support the same with the center of gravity thereof near the axis of the end-rings.

2. A structure as specified in claim 1, in combination with means for securing the end-rings in fixed relation to the arcuate seats.

3. A structure as specified in claim 1, in which the end-rings have relatively large axial openings to enable portions remote from the center of gravity of a supported engine-body to extend longitudinally through the end-rings.

4. A structure as specified in claim 1, in combination with means at the outer side of one of the end-rings for securing thereto the fly-wheel flange of the engine crank-shaft.

5. A structure as specified in claim 1, in which the longitudinal member has a bowed portion intermediate its ends and longitudinally spaced from the portions adapted for connection with the engine-body.

6. A structure as specified in claim 1, in which the longitudinal member is provided with openings adapted to receive studs from the parts of the engine-body normally carrying the exhaust and intake manifold-pipes therefor.

THOMAS K. NELSON.

Copies of this patent may be obtained for five cents each, by addressing the "Commissioner of Patents, Washington, D. C."